US012472276B2

(12) United States Patent
DeCamp et al.

(10) Patent No.: US 12,472,276 B2
(45) Date of Patent: Nov. 18, 2025

(54) COMBINED AIR PURIFICATION AND OBJECT STERILIZATION APPARATUS AND METHOD OF USE

(71) Applicant: Radiant Solutions Group, LLC, Cincinnati, OH (US)

(72) Inventors: William DeCamp, Cincinnati, OH (US); Katarina DeCamp, Cincinnati, OH (US)

(73) Assignee: Radiant Solutions Group, LLC, Cincinnati, OH (US)

( * ) Notice: Subject to any disclaimer, the term of this patent is extended or adjusted under 35 U.S.C. 154(b) by 1067 days.

(21) Appl. No.: 17/406,816

(22) Filed: Aug. 19, 2021

(65) Prior Publication Data
US 2022/0054676 A1 Feb. 24, 2022

Related U.S. Application Data

(60) Provisional application No. 63/067,521, filed on Aug. 19, 2020.

(51) Int. Cl.
*A61L 2/10* (2006.01)
*A61L 2/24* (2006.01)
*A61L 9/20* (2006.01)

(52) U.S. Cl.
CPC .................. *A61L 2/10* (2013.01); *A61L 2/24* (2013.01); *A61L 9/20* (2013.01); *A61L 2202/11* (2013.01);
(Continued)

(58) Field of Classification Search
CPC .......... A61L 2/24; A61L 9/20; A61L 2202/11; A61L 2202/122; A61L 2202/14; A61L 2202/16
See application file for complete search history.

(56) References Cited

U.S. PATENT DOCUMENTS 6,464,760 B1  10/2002  Sham et al.
8,662,705 B2   3/2014  Roberts
(Continued)

FOREIGN PATENT DOCUMENTS

KR       200447932 Y1   3/2010
KR     20110077804 A    7/2011
(Continued)

OTHER PUBLICATIONS

English translation of KR-101763381-B1 (Year: 2017).*

*Primary Examiner* — Sean E Conley
(74) *Attorney, Agent, or Firm* — Dinsmore & Shohl LLP

(57) ABSTRACT

An air purification and object sterilization apparatus includes an outer housing that defines a volume therein. The volume is divided into a fan compartment and an air purification and sterilization compartment. A fan assembly is configured to draw surrounding air into the air purification and sterilization compartment and then into the fan compartment. A sterilization compartment is located in the air purification and sterilization compartment. A portion of the outer housing is movable to access the sterilization compartment. A lamp assembly includes a light source located in the air purification and sterilization compartment that provides ultraviolet radiation to the sterilization compartment and to the air drawn into the air purification and sterilization compartment by the fan assembly.

16 Claims, 4 Drawing Sheets

(52) U.S. Cl.
 CPC ..... *A61L 2202/122* (2013.01); *A61L 2202/14* (2013.01); *A61L 2202/16* (2013.01); *A61L 2209/111* (2013.01); *A61L 2209/134* (2013.01); *A61L 2209/14* (2013.01)

(56) References Cited

U.S. PATENT DOCUMENTS

| | | |
|---|---|---|
| 10,639,387 B2 | 5/2020 | Bonutti et al. |
| 10,874,756 B1 * | 12/2020 | Guerrero .................... A61L 2/28 |
| 2005/0194026 A1 * | 9/2005 | Lu ............................. A61L 2/04 |
| | | 134/105 |
| 2008/0112845 A1 | 5/2008 | Dunn et al. |

FOREIGN PATENT DOCUMENTS

| | | |
|---|---|---|
| KR | 20120103525 A | 9/2012 |
| KR | 101763381 B1 * | 7/2017 |

* cited by examiner

COMBINED AIR PURIFICATION AND OBJECT STERILIZATION APPARATUS AND METHOD OF USE

CROSS-REFERENCE

This application claims the benefit of and priority to U.S. Provisional Application No. 63/067,521 filed Aug. 19, 2020, titled Combined Air Purification and Object Sterilization Apparatus and Methods of Use," the details of which are incorporated by reference as if fully set forth herein.

TECHNICAL FIELD

The present specification generally relates to air purification and sterilization devices and, more specifically, to an air purification and object sterilization apparatus that combines both air purification and air sterilization into a single appliance.

BACKGROUND

Air purification apparatuses are known. The air purification apparatuses typically force air from the surroundings through a filter or number of filters that can be used to remove dust and other particles from the air and circulate the cleaner air back into the surroundings. Ultraviolet light may be used to control airborne pathogens in the air. These pathogens may include viruses and bacteria.

Object sterilization apparatuses are also known. The object sterilization apparatuses may also use ultraviolet radiation to destroy microorganisms on the objects.

What is needed is an apparatus that combines both air purification and object sterilization into a single device.

SUMMARY

In one embodiment, an air purification and object sterilization apparatus includes an outer housing that defines a volume therein. The volume is divided into a fan compartment and an air purification and sterilization compartment. A fan assembly is configured to draw surrounding air into the air purification and sterilization compartment. A sterilization compartment is located in the air purification and sterilization compartment. A portion of the outer housing is movable to access the sterilization compartment. A lamp assembly includes a light source located in the air purification and sterilization compartment that provides ultraviolet radiation to the sterilization compartment and to the air drawn into the air purification and sterilization compartment by the fan assembly.

In another embodiment, a method of sterilizing an object while sterilizing air using an air purification and object sterilization apparatus is provided. The method includes placing the object in a sterilization compartment of the air purification and object sterilization apparatus. The sterilization compartment is located in an air purification and sterilization compartment of the air purification and object sterilization apparatus. Surrounding air is pulled into the air purification and sterilization compartment using a fan assembly. The air and the object are exposed to ultraviolet radiation using an ultraviolet light source located in the air purification and sterilization compartment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally directed to air purification and object sterilization apparatuses that combine both air purification and object sterilization systems into a single appliance. The functions of the air purification and object sterilization systems may also be combined, such that there is utilization of both systems during air purification and object sterilization. The air purification and object sterilization apparatuses include an outer housing that may be divided into multiple compartments. A fan compartment may house a fan assembly that includes a motor that rotates an impeller that is in communication with an air purification and sterilization compartment for drawing air through the purification and sterilization compartment. The air purification and sterilization compartment may include an ultraviolet (UV) light source that provides UV-C radiation in the 200-280 nanometer (nm) wavelength range. Light in the UV-C wavelength can be used for disinfection, sterilizing surfaces, destroying harmful micro-organisms in air.

The air purification and object sterilization apparatuses may be relatively small and portable and be capable of placement on a table, chair, countertop or other suitable location within a home, office or business. The air purification and object sterilization apparatuses may be portable (e.g., less than 30 lbs, such as less than 25 lbs, such as less than 20 lbs, such as less than 15 lbs, such as less than 10 lbs) and of relatively small size, such as no greater than about 3 ft in length, width and height.

Figure 1:
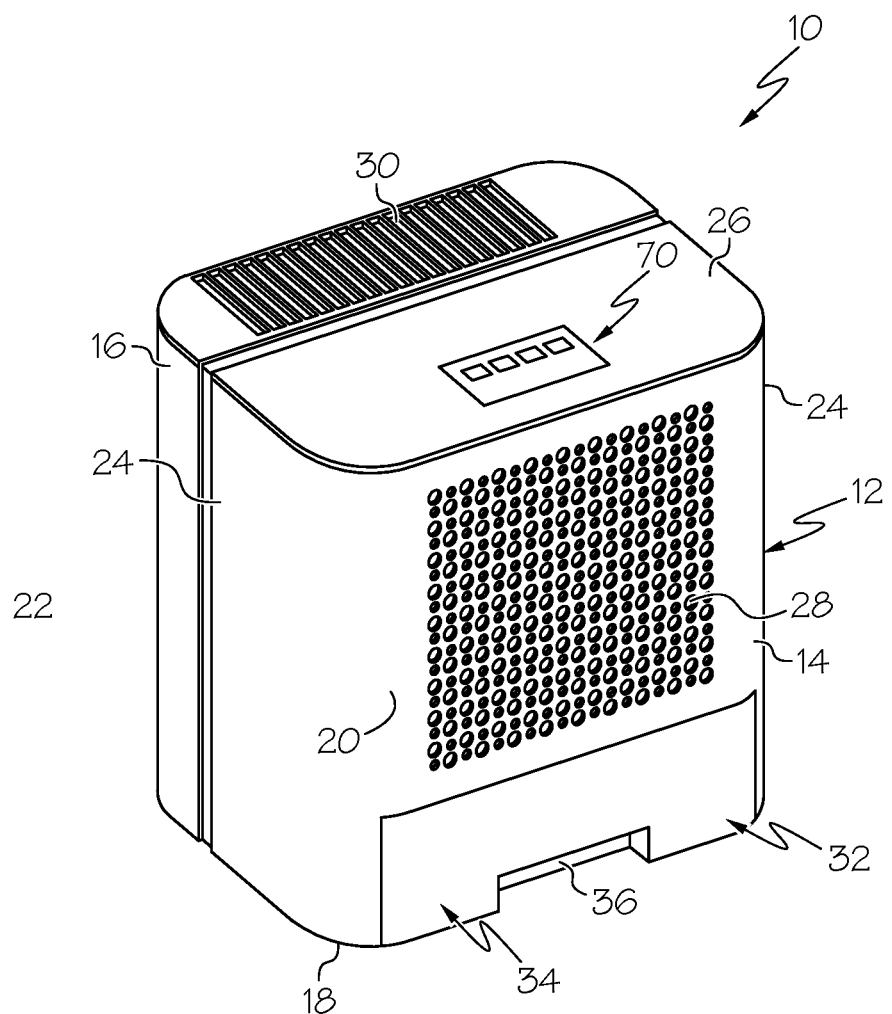
FIG. 1 is a perspective view of an air purification and object sterilization apparatus, according to one or more embodiments shown and described herein.

Referring to FIG. 1, an air purification and object sterilization apparatus 10 includes an outer housing 12. The outer housing 12 includes a main body 14 that is somewhat box-shaped having a top 16, a bottom 18, a front 20, a rear 22 and sides 24 that extend between the front 20 and the rear 22. One or more lids 26 may be used to cover the top 16 of the main body 14. The lid 26 may or may not be removable. When the lid 26 is removable, a user can gain access to inside the outer housing 12, for example, to replace components, such as UV light source. While the outer housing is illustrated a box-shaped, the outer housing may be in any suitable shape depending, for example, on styling and space constraints for systems and components located in the outer housing 12, which will be described in greater detail below.

The front 20 of the outer housing 12 may include openings 28 that provide an air intake structure for allowing air to be drawn into the outer housing 12 from the surroundings. The openings 28 can be located on the bottom 18, a front 20, a rear 22, sides 24 and lid 26 and any combination thereof. The lid 26 includes another set of openings 30 that provide a vent structure to allow filtered air to exit the outer housing 12. The openings 30 can be located on the front 20, the bottom 18, a front 20, a rear 22, sides 24 and any combination thereof.

The outer housing 12 includes a movable portion 32. The movable portion 32 is movable between a closed position, as shown by FIG. 1, and an open position. The movable portion 32 may be part of a sanitization compartment 34 in which objects to sterilize can be placed. The movable portion 32 may include a handle 36, such as a recess that can facilitate grasping of the sanitization compartment 34 and moving the sanitization compartment 34 manually. In some embodiments, an actuator may be provided that can move the sanitization compartment 34 between the closed and open positions automatically based on a user input, for example, or some other input, such as a predetermined time. In some embodiments, an actuator may be used to move a locking system from an unlocked configuration to a locked configuration for locking the sanitation compartment in a closed position.

Figure 2:
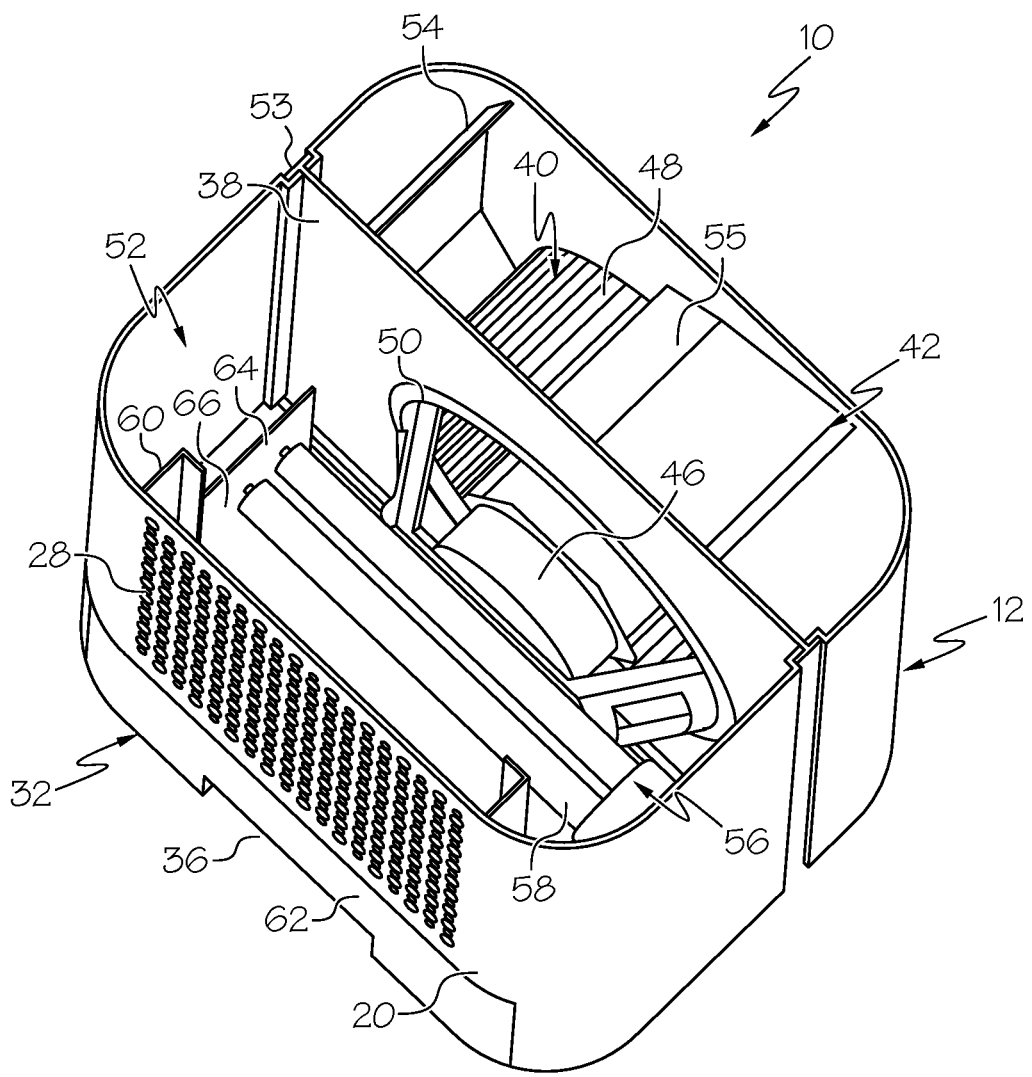
FIG. 2 is another perspective view of the air purification and object sterilization apparatus of FIG. 1 with a lid removed, according to one or more embodiments shown and described herein.

Referring to FIG. 2, the air purification and object sterilization apparatus 10 illustrated with the lid 26 removed. The outer housing 12 forms a housing volume that is divided into multiple compartments by a fan support wall 38 of a fan assembly 40. The fan support wall 38 may be made separately from the outer housing 12 and connected thereto using interlocking features 53, or the fan support wall 38 may be formed as a monolithic part of the outer housing 12. A fan compartment 42 may house the fan assembly 40 that includes a motor 46 and an impeller 48 that is rotated by the motor 46. The fan can be any revolving vane, or vanes used for producing currents of air. In some embodiments, the fan assembly may comprise a centrifugal fan; however, any suitable fan arrangement may be used. As can be seen, the fan assembly 40 is mounted at an opening 50 in the fan support wall 38 in order to draw air through the openings 28, into an air purification and sterilization compartment 52 and through the opening 50. The air may then be directed using a flow directing structure 55 through the openings 30 in the lid 26 and into the surroundings. In some embodiments, a filter mounting structure 54 may be located in the fan compartment 42 to support a filter (also represented by element 54) at a location aligned with the openings 30 in the lid 26. The air may be forced though the filter to remove odors from the environment and/or from the air purification and object sterilization apparatus 10 before exiting through the lid 26. For example, the filter may include an activated carbon.

The air purification and sterilization compartment 52 may house a sterilization lamp assembly 56 that provides an ultraviolet light source using ultraviolet bulbs 58. In the illustrated example, there are two ultraviolet bulbs or arrays of UV-C LED diodes; however, any number of ultraviolet bulbs may be used. The sterilization lamp assembly 56 may provide radiation in the UV-C wavelength range (200-280 nm). Light in the UV-C wavelength can be used for disinfection, sterilization of surfaces and destroying micro-organisms in the air. A filter mounting structure 60 may be located in the air purification and sterilization compartment 52 to support one or multiple filters (also represented by element 60) aligned with the openings 28 through the front 20 of the outer housing 12. The filter may be part of an air intake assembly that includes a pre-filter and a HEPA filter for removing dirt, dust, pollen and other airborne particles.

Figure 5:
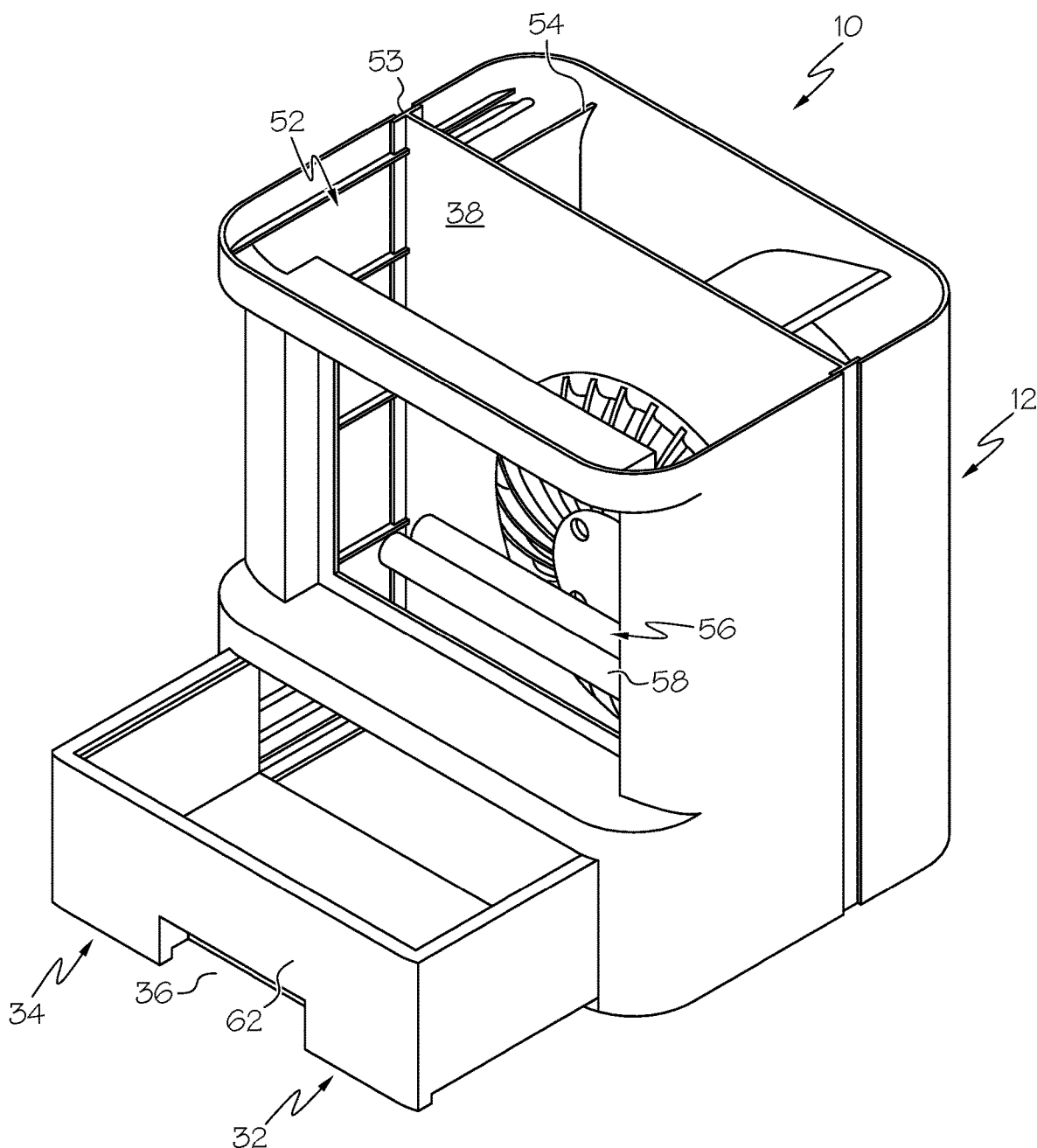
FIG. 5 is a perspective view of another embodiment of an air purification and object sterilization apparatus with a sterilization compartment in an open configuration, according to one or more embodiments shown and described herein.

The movable portion 32 of the outer housing 12 may be in the form of a drawer that lies underneath or otherwise adjacent to the sterilization lamp assembly 56. The moveable portion 32 includes a front wall 62 that includes the handle 36 and side walls 64 that together with a bottom wall 66 form the sanitization compartment 34. The moveable portion 32 may be moved from the illustrated closed position to an open position pulled out from the outer housing 12 in order to expose the sanitization compartment 34 and place items, such as cellphones, masks, toothbrushes, etc. therein (FIG. 5). In the closed position, the sanitization compartment 34 is exposed to the sterilization lamp assembly 56 and its ultraviolet light source for receiving the ultraviolet radiation.

Referring briefly to FIG. 1, the air purification and object sterilization apparatus 10 may include a user input device 70 that allows for control of operation of the air purification and object sterilization apparatus 10. The user input device 70 may include any suitable controls, such as buttons, dials, switches, knobs, etc. A display, such as a touchscreen display may be used as a user input device.

Figure 3:
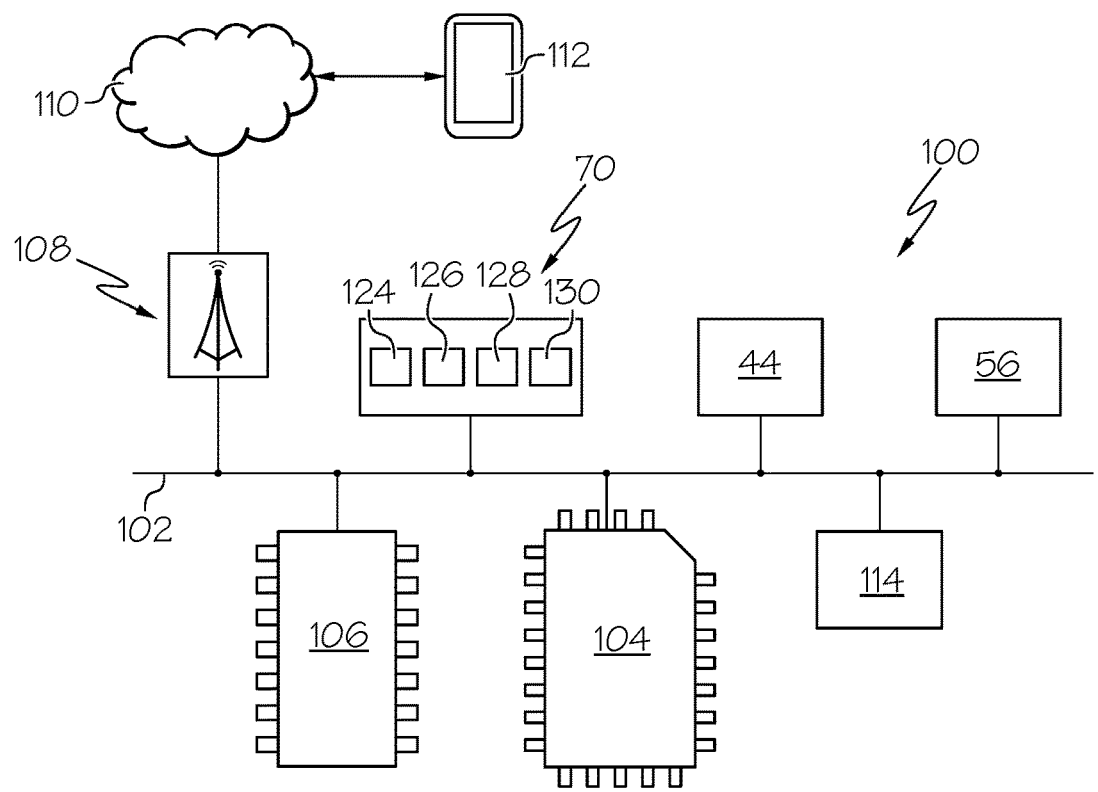
FIG. 3 is a diagrammatic illustration of a control system for the air purification and object sterilization apparatus of FIG. 1, according to one or more embodiments shown and described herein.

Referring to FIG. 3, a control system 100 for the air purification and object sterilization apparatus 10 is illustrated schematically. The control system 100 includes a communication path 102, a processor 104, a memory module 106, and the user input device 70. The control system 100 may further include network interface hardware 108. Although not shown, the control system 100 may include any one or more of lights, speakers and outer output devices connected to the communication path 102 that provide an indicator to a user of a status (e.g., operation, filter replacement, time, etc.) or other information.

The control system 100 includes the communication path 102 that provides data interconnectivity between various controllable components of the air purification and object sterilization apparatus 10, such as the fan assembly 44 and the sterilization lamp assembly 56. Further, the controllable components can operate as a node that may send and/or receive data. In some embodiments, the communication path 102 includes a conductive material that permits the transmission of electrical data signals to processors, memories, sensors, and actuators throughout the control system 100. In some embodiments, the communication path 102 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The control system 100 includes the processor 104 communicatively coupled with the memory module 106 over the communication path 102. The processor 104 may include any device capable of executing machine-readable instructions stored on a non-transitory computer-readable medium. The processor 104 may include one or more processors. Accordingly, each processor 104 may include a controller, an integrated circuit, a microchip, a computer, and/or any other computing device.

The memory module 106 is communicatively coupled to the processor 104 over the communication path 102. The memory module 106 may be configured as volatile and/or nonvolatile memory and, as such, may include random access memory (including SRAM, DRAM, and/or other types of RAM), flash memory, secure digital (SD) memory, etc. Depending on the particular embodiment, these non-transitory computer-readable mediums may reside within the control system 100 and/or external to the control system 100. The memory module 106 may be configured to store one or more pieces of logic. The memory module 106 may include one or more memory modules. The embodiments described herein may utilize a distributed computing arrangement to perform any portion of the logic described herein.

Embodiments of the present disclosure include logic stored on the memory module 106 that includes machine-readable instructions and/or an algorithm written in any programming language of any generation (e.g., 1GL, 2GL, 3GL, 4GL, and/or 5GL) such as, machine language that may be directly executed by the processor 104, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

The control system 100 includes the user input device 70 coupled to the communication path 102 such that the communication path 102 communicatively couples the user input device 70 to other modules of the control system 100. As described above, the user input device 70 may be controlled manually. In some embodiments, there may be multiple user input devices. The user input device 70 may be any device capable of transforming mechanical, optical, or electrical signals into a data signal capable of being transmitted with the communication path 102. Specifically, the user input device 70 may include any number of movable objects that transform physical motion into a data signal that can be transmitted over the communication path 102 such as, for example, a button, a switch, a knob, a microphone or the like. In some embodiments, a display and the user input device 70 are combined as a single module and operate as a touchscreen user input device. However, it is noted, that a display and the user input device 70 may be separate from one another. In some embodiments, there may not be a display. The user input device 70 may allow a user to control operation of the air purification and object sterilization apparatus 10.

In some embodiments, the control system 100 further includes network interface hardware 108 for communicatively coupling the control system 100 with a network 110. The network interface hardware 108 can be communicatively coupled to the communication path 102 and can be any device capable of transmitting and/or receiving data via the network 110. Accordingly, the network interface hardware 108 can include a communication transceiver for sending and/or receiving any wired or wireless communication. For example, the network interface hardware 108 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 108 includes hardware configured to operate in accordance with the Bluetooth wireless communication protocol. In another embodiment, network interface hardware 108 may include a Bluetooth send/receive module for sending and receiving Bluetooth communications to/from a mobile device 112.

The control system 100 may communicate, through the network interface hardware 108, with the network 110 to communicatively couple the control system 100 with the mobile device 112. In one embodiment, the network 110 is a personal area network that utilizes Bluetooth technology to communicatively couple the control system 100 and the mobile device 112. In other embodiments, the network 110 may include one or more computer networks (e.g., a personal area network, a local area network, or a wide area network), cellular networks, satellite networks and/or a global positioning system and combinations thereof. Accordingly, the control system 100 can be communicatively coupled to the network 110 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

In some embodiments, the mobile device 112 may be included as a user input device. The mobile device 112 may include a processor and a memory module. The processor can execute logic to communicate with the control system 100 in order to facilitate sending instructions to the control system 100 from the mobile device 112 to control the air purification and object sterilization apparatus 10. The mobile device 112 may be configured with wired and/or wireless communication functionality for communicating with the control system 100. In embodiments described herein, the mobile device 112 may include mobile phones, smartphones, personal digital assistants, dedicated mobile media players, mobile personal computers, laptop computers, and/or any other mobile devices capable of being communicatively coupled with the control system 100. It is noted, that in this embodiment, the control system 100 may communicate with the mobile device 112 even while the mobile device 112 is remote from the air purification and object sterilization apparatus 10. In this way, the air purification and object sterilization apparatus 10 may be controlled with the mobile device 112 remotely.

The control system 100 may further include a display 114 for providing visual output such as, for example, entertainment, information, image data, usage data, time data, or a combination thereof. The display 114 may be coupled to the communication path 102. The display 114 may include any medium capable of transmitting an optical output such as, for example, light emitting diodes, a liquid crystal display, a plasma display, or the like. Moreover, the display 114 may be a touchscreen that, in addition to providing optical information, detects the presence and location of a tactile input upon a surface of or adjacent to the display 114. Accordingly, the display 114 may receive mechanical input directly upon the optical output provided by the display 114. As such, the display 114 may be included as a user input device. Additionally, it is noted that the display 114 can include a processor and a memory module.

The control system 100 allows for user control and, in some embodiments, automatic control of the air purification system 120 including the motor 46 and the object sterilization system 122 including the lamp assembly 56. As can be appreciated, the air purification system 120 and the object sterilization system 122 can cooperate to achieve air purification and object sterilization. The user input device 70 may include multiple controls, such as buttons 124, 126, 128 and 130, where a user can select from different modes of operation for the air purification and object sterilization apparatus 10. As an example, button 124 may be used to activate a Viral Mode (e.g., 60 cfm) where the fan assembly 44 pulls air into the air purification and sterilization compartment at the lowest speed, button 126 may be used to activate a Bacteria Mode where the fan assembly 44 operates at a higher, intermediate speed and an Allergen Mode where the fan assembly operates at a highest speed (e.g., 120 cfm). Button 130 may be a Scrub Mode that cycles through each of the modes over specified intervals. The lower the fan speed, the more time the air is exposed to the lamp assembly and the ultraviolet light. There may also be an automatic shut-off timer to automatically shut off the air purification and object sterilization apparatus 10 after a preselected time period, such as 2, 4 and 8 hours. A sensor or mechanical interlock may be provided that shuts off the air purification and object sterilization apparatus 10 if the movable portion 32 is opened. In some embodiments, a lock device may be provided that locks the moveable portion 32 in the closed position when the air purification and object sterilization apparatus 10 is active. Filter status and lamp assembly status indicators (e.g., lights) may be provided that provide an indication of filter and bulb life. An air quality sensor may be used with the control system to allow for adjustment of fan speed and/or the lamp assembly output based on output received from the air quality sensor that is indicative of air quality. A light sensor may be used to detect night time or darkness conditions and control fan speed and/or the lamp assembly output based on output from the light sensor. For example, the controller may place the air purification and object sterilization apparatus into a night time or quiet mode of reduced fan speed.

Figure 4:
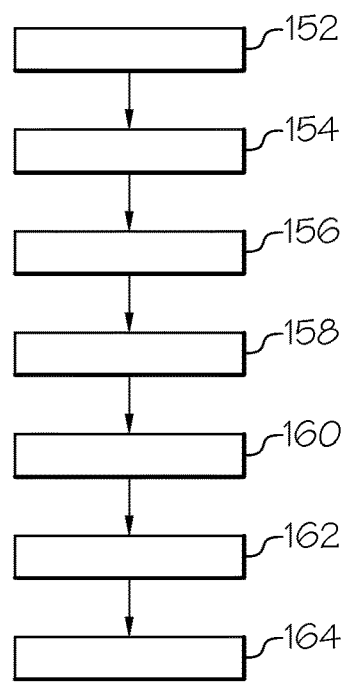
FIG. 4 is a method of using the air purification and object sterilization apparatus of FIG. 1, according to one or more embodiments shown and described herein.

Referring to FIG. 4, a method 150 of operating the air purification and object sterilization apparatus includes moving the movable portion to the open configuration at step 152. At step 154, an object is placed in the sanitation compartment and the movable portion may be moved to the closed position at step 156. At step 158, the user then selects a mode using the user input device. Upon user selection of a mode, the air purification and object sterilization apparatus is activated and the fan assembly pulls air into the air purification and sanitation compartment where both the air and the objects are exposed to UV light for a sterilization operation at step 160. The air is also drawn through the filters for a filtration operation. The sanitized air is then directed out of the air purification and object sterilization apparatus, as discussed above, at step 162. Once the air purification and object sterilization operation is complete, the movable portion may be opened and the objects removed at step 164. In some embodiments, the air purification and object sterilization apparatus may be activated for air purification only, without placing objects in the sanitation compartment or for object sterilization only without activating the fan assembly.

For the purposes of describing and defining the present disclosure, it is noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present disclosure it is noted that the terms "substantially" and "approximately" and "about" are utilized herein to represent the inherent degree of uncertainty that may be attributed to any quantitative comparison, value, measurement, or other representation. The terms "substantially" and "approximately" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising".

What is claimed is:

1. An air purification and object sterilization apparatus comprising:
    an outer housing that defines a volume therein, the volume being divided into a fan compartment and an air purification and sterilization compartment;
    a fan assembly configured to draw surrounding air into the air purification and sterilization compartment then through a fan support wall that divides the volume into the fan compartment and air purification and sterilization compartment, the fan support wall configured to support the fan assembly within the fan compartment and extending from a top of the housing toward a bottom of the housing such that the air purification and sterilization compartment is entirely in front of the fan compartment between a front of the outer housing and the fan support wall;

a sterilization compartment located in the air purification and sterilization compartment, a portion of the outer housing being movable to access the sterilization compartment;

a lamp assembly comprising an ultraviolet light source located in the air purification and sterilization compartment that provides ultraviolet radiation to the sterilization compartment and to the air drawn into the air purification and sterilization compartment by the fan assembly; and a drawer having a closed configuration inside the air purification and sterilization compartment and an open configuration at least partially outside the air purification and sterilization compartment, the drawer located on a same wall as an air intake structure comprising one or more openings through which air enters the air purification and sterilization compartment.

2. The air purification and object sterilization apparatus of claim 1, wherein the portion of the outer housing comprises a handle used to move the sterilization compartment between the open configuration and the closed configuration.

3. The air purification and object sterilization apparatus of claim 1, wherein the fan support wall provides a boundary to a rear side of the air purification and sterilization compartment and comprises an opening in which a motor of the fan assembly is mounted.

4. The air purification and object sterilization apparatus of claim 1 further comprising a vent structure through which air exits the fan compartment.

5. The air purification and object sterilization apparatus of claim 4, wherein one or both of the air intake structure and vent structure comprises an air filter.

6. The air purification and object sterilization apparatus of claim 4 further comprising a flow directing structure comprising a surface that directs air from the fan assembly toward the vent structure.

7. The air purification and object sterilization apparatus of claim 1, wherein the ultraviolet light source is a UV-C light source.

8. The air purification and object sterilization apparatus of claim 1 further comprising a control system that is configured to control operation of the fan assembly based on a user-selected mode.

9. A method of sterilizing an object while sterilizing air using an air purification and object sterilization apparatus, the method comprising:

placing the object in a sterilization compartment of the air purification and object sterilization apparatus, the sterilization compartment located in an air purification and sterilization compartment of the air purification and object sterilization apparatus;

pulling surrounding air into the air purification and sterilization compartment then through a fan support wall that divides the volume into the fan compartment and air purification and sterilization compartment using a fan assembly, the fan support wall configured to support the fan assembly within the fan compartment and extending from a top of the housing toward a bottom of the housing such that the air purification and sterilization compartment is entirely in front of the fan compartment between a front of the outer housing and the fan support wall;

exposing the air and the object to ultraviolet radiation using an ultraviolet light source located in the air purification and sterilization compartment; and moving a drawer having a closed configuration inside the air purification and sterilization compartment and an open configuration at least partially outside the air purification and sterilization compartment, the drawer located on a same wall as an air intake structure comprising one or more openings through which air enters the air purification and sterilization compartment.

10. The method of claim 9, wherein the drawer comprises a handle used to move the sterilization compartment between the open configuration and the closed configuration.

11. The method of claim 9, wherein the fan support wall comprises an opening in which a motor of the fan assembly is mounted.

12. The method of claim 9 further comprising a vent structure through which air exits the fan compartment.

13. The method of claim 12, wherein one or both of the air intake structure and vent structure comprises an air filter.

14. The method of claim 12 further comprising a flow directing structure comprising a surface directing air from the fan assembly toward the vent structure.

15. The method of claim 9, wherein the ultraviolet light source is a UV-C light source.

16. The method of claim 9 further comprising using a control system selecting a user-selected mode, the control system controlling operation of the fan assembly based on the user-selected mode.

* * * * *